US007668344B2

(12) United States Patent
Matsumoto et al.

(10) Patent No.: US 7,668,344 B2
(45) Date of Patent: Feb. 23, 2010

(54) STAIN INSPECTION METHOD AND APPARATUS

(75) Inventors: Ichiro Matsumoto, Miyagi (JP); Tetsuo Nishikawa, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 788 days.

(21) Appl. No.: 11/349,962

(22) Filed: Feb. 9, 2006

(65) Prior Publication Data

US 2006/0193497 A1   Aug. 31, 2006

(30) Foreign Application Priority Data

Feb. 17, 2005  (JP) ............... 2005-041112

(51) Int. Cl.
G06K 9/00 (2006.01)
G01N 21/00 (2006.01)
(52) U.S. Cl. .................. 382/112; 356/73.1
(58) Field of Classification Search ........... 382/100, 382/112; 348/234, 235, 236, 237, 238, 382, 348/396.1, 489, 493, 631, 663, 712; 356/73.1, 356/237.1, 426; 358/520, 500; 359/367, 359/491
See application file for complete search history.

(56) References Cited

U.S. PATENT DOCUMENTS 7,133,565 B2 * 11/2006 Toda et al. ............ 382/243
7,239,740 B1 *  7/2007 Fujieda ................ 382/150
7,561,752 B2 *  7/2009 Monobe et al. ........ 382/268

FOREIGN PATENT DOCUMENTS

| JP | 9-329527    | 12/1997 |
| JP | 10-206344   | 8/1998  |
| JP | 11-66311    | 3/1999  |
| JP | 2003-329597 | 11/2003 |

* cited by examiner

Primary Examiner—Abolfazl Tabatabai
(74) Attorney, Agent, or Firm—McGinn IP Law Group, PLLC

(57) ABSTRACT (A) Luminance data is prepared. (B) A group of first order differential values is obtained from luminance values of said luminance data along a first direction, a group of second order differential values is obtained from the group of first order differential values, and first data is output in accordance with the group of second order differential values. There is provided a stain inspection method having high inspection correctness.

33 Claims, 8 Drawing Sheets

FIG.4A  13a

| 1 | 1 | 1 | 1 | 1 |
|---|---|---|---|---|
| 0 | 0 | 0 | 0 | 0 |
| -1 | -1 | -1 | -1 | -1 |
| 0 | 0 | 0 | 0 | 0 |
| -1 | -1 | -1 | -1 | -1 |
| 0 | 0 | 0 | 0 | 0 |
| 1 | 1 | 1 | 1 | 1 |

FIG.4B  13b

| 1 | 0 | -1 | 0 | -1 | 0 | 1 |
|---|---|---|---|---|---|---|
| 1 | 0 | -1 | 0 | -1 | 0 | 1 |
| 1 | 0 | -1 | 0 | -1 | 0 | 1 |
| 1 | 0 | -1 | 0 | -1 | 0 | 1 |
| 1 | 0 | -1 | 0 | -1 | 0 | 1 |

FIG.4C  13a

| 1 | -1 | -1 | 1 |
|---|---|---|---|
| 1 | -1 | -1 | 1 |
| 1 | -1 | -1 | 1 |
| 1 | -1 | -1 | 1 |
| 1 | -1 | -1 | 1 |
| 1 | -1 | -1 | 1 |

FIG.4D  13b

| 1 | -1 | -1 | 1 |
|---|---|---|---|
| 1 | -1 | -1 | 1 |
| 1 | -1 | -1 | 1 |
| 1 | -1 | -1 | 1 |
| 1 | -1 | -1 | 1 |
| 1 | -1 | -1 | 1 |

FIG.5A

| 1 | 0 | −1 | 0 | −1 | 0 | 1 |
|---|---|---|---|---|---|---|
| 2 | 0 | −2 | 0 | −2 | 0 | 2 |
| 4 | 0 | −4 | 0 | −4 | 0 | 4 |
| 2 | 0 | −2 | 0 | −2 | 0 | 2 |
| 1 | 0 | −1 | 0 | −1 | 0 | 1 |

FIG.5B

| 1 | 2 | 4 | 2 | 1 |
|---|---|---|---|---|
| 0 | 0 | 0 | 0 | 0 |
| −1 | −2 | −4 | −2 | −1 |
| 0 | 0 | 0 | 0 | 0 |
| −1 | −2 | −4 | −2 | −1 |
| 0 | 0 | 0 | 0 | 0 |
| 1 | 2 | 4 | 2 | 1 |

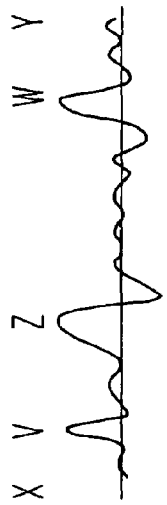
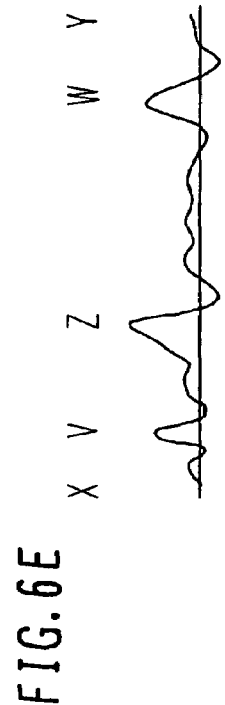
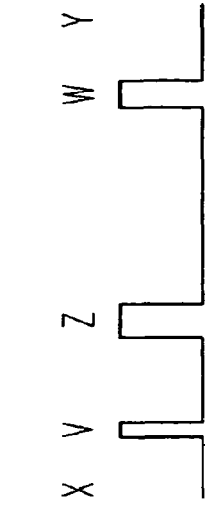
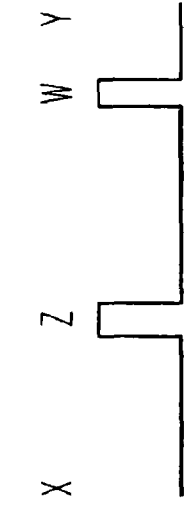
FIG.6D  FIG.6E  FIG.6F  FIG.6G
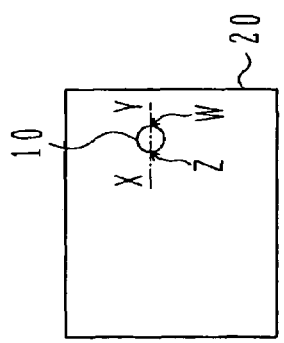
FIG.6A
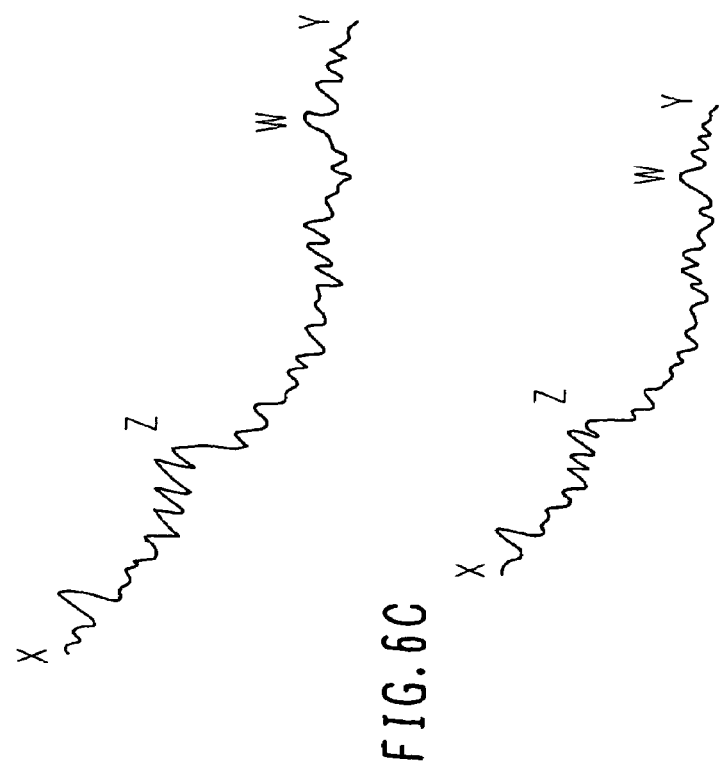
FIG.6B
FIG.6C

STAIN INSPECTION METHOD AND APPARATUS

CROSS REFERENCE TO RELATED APPLICATION

This application is based on and claims priority of Japanese Patent Application No. 2005-041112 filed on Feb. 17, 2005, the entire contents of which are incorporated herein by reference.

BACKGROUND OF THE INVENTION

A) Field of the Invention

The present invention relates to a method and apparatus to be used for inspecting stains.

B) Description of the Related Art

One of defects formed in a charge coupled device (CCD) solid state image pickup device, a MOS solid state image pickup device, a liquid crystal display (LCD) and a plasma display panel (PDP) is a luminance change like a "stain" appearing when a uniform white image is photographed or displayed. The "stain" includes a stain brighter than a peripheral area and a stain darker than a peripheral area, respectively called a "white stain" and a "black stain". Namely, the "white stain" has a luminance of the inner area of the stain higher than that of the peripheral area of the stain, whereas the "black stain" has a luminance of the inner area of the stain lower than that of the peripheral area of the stain. "Irregularity" indicates the state that a luminance change extends in a broad area.

The "stain" means "components changing relatively smoothly and locally in output signal unevenness in a bright state, and a plane defect in a relatively large area of a screen to be caused by dirt of a lid glass or photodiodes". This definition is applied flexibly. For example, "irregularity" is assumed to be included in "stain".

For example, a photographed image of a color solid state image pickup device has in some cases a very low luminance irregularity (white stain, black stain and the like) to be caused by defects formed during a process of manufacturing color filters of three primary colors: red (R), green (G) and blue (B).

A brightness of an image on a solid state image pickup device or a display device is not even over the whole area, but the central image area is bright and the peripheral image area is dark. This characteristic is called luminance shading.

Almost all images taken with a solid state image pickup device have luminance shading. A difference between a highest luminance (luminance of a central image area) value and a lowest luminance (luminance of an image peripheral area) value is generally about several % to 10% of an average value of a luminance of the whole image.

The "stain" is also a defect caused by luminance unevenness. However, a stain luminance and a stain peripheral area luminance have often a difference of only several %, and this difference has a level very near to a noise level. A luminance level difference from a luminance of a peripheral image area is small and the luminance at a boundary (edge portion) between the stain portion and the other portion is approximately the same level as that of the peripheral image area, without a steep luminance change. In such a state, it is difficult to detect a stain by a method of simply obtaining a luminance change (slope), because the influence of luminance shading exists additionally.

The present circumstance is that automatic stain inspection is difficult and inspection is made visually by inspectors (for example, refer to JP-A-HEI-2003-329597). This is because human eyes can recognize often a luminance difference clearly even if a difference between measured luminance values is not large.

However, since visual inspection by human eyes is subjective evaluation, a variation in inspection results by inspectors is likely to occur. Another problem is that time and cost required for inspections become enormous. Automatic inspection has therefore been studied.

A method has been disclosed for extracting an edge by using a spatial filter utilizing a first order difference of the Prewitt or Sobel operator of 3×3 pixels (for example, refer to JP-A-HEI-10-206344).

However, if an image has the luminance shading which essentially has an inclination, it is often difficult to detect an edge by using a Sobel filter.

Techniques of detecting a stain have been disclosed excluding the influence of luminance shading (for example, refer to JP-A-HEI-9-329527)

First, noise components are eliminated from an original image by using a low-pass filter (LPF). An image having only the luminance sharing characteristic is therefore obtained. Next, the obtained luminance characteristic is subtracted from the original image. In this manner, the luminance shading is excluded from the image to detect stains.

This method is effective for detecting, for example, flaws. However, since LPF is used, a difference between luminances and a change (inclination) amount in luminances at an edge become smaller so that stains are difficult to be detected.

Further, it is necessary to prepare separately a means for eliminating luminance shading and a means for detecting an edge. Furthermore, it takes a time to detect a stain.

Techniques of removing luminance shading have been disclosed using a planarizing module with a spline function (for example, refer to JP-A-HEI-11-66311).

SUMMARY OF THE INVENTION

An object of the present invention is to provide a stain inspection apparatus capable of shortening an inspection time, and to provide a stain inspection apparatus capable of highly correct inspection.

Another object of the present invention is to provide a stain inspection method capable of shortening an inspection time, and to provide a stain inspection method capable of highly correct inspection.

According to one aspect of the present invention, there is provided a stain inspection method comprising steps of: (a) preparing luminance data; and (b) obtaining a group of first order differential values from luminance values of the luminance data along a first direction, obtaining a group of second order differential values from the group of first order differential values, and outputting first data in accordance with the group of second order differential values.

According to another aspect of the present invention, there is provided a stain inspection apparatus comprising filtering means including a first, second order differential filter for obtaining a group of first order differential values from luminance values of the luminance data along a first direction, obtaining a group of second order differential values from the group of first order differential values.

Stains can be detected effectively by using the above-described stain inspection method and apparatus.

Both removal of the influence of luminance shading and detection of a stain edge portion become possible by using the second order differential filter, so that an inspection time can be shortened.

According to one aspect of the present invention, there is provided a stain inspection method comprising steps of: (k) preparing luminance data; and (l) binarizing the luminance data.

According to another aspect of the present invention, there is provided a stain inspection apparatus comprising binarizing means for binarizing luminance data.

Stains can be detected effectively by using the above-described stain inspection method and apparatus.

According to the present invention, a stain inspection apparatus can be provided which can shorten an inspection time. A stain inspection apparatus can be provided which can realize high inspection correctness.

According to the present invention, a stain inspection method can be provided which can shorten an inspection time. A stain inspection method can be provided which can realize high inspection correctness.

BRIEF DESCRIPTION OF THE DRAWINGS

FIGS. 4A to 4D are diagrams showing examples of a horizontal direction differential filter 13a and a vertical direction differential filter 13b.

FIGS. 5A and 5B are diagrams showing a filter formed by improving the horizontal differential filter 13a shown in FIG. 4A and a filter formed by improving the horizontal differential filter 13b shown in FIG. 4B, respectively.

FIGS. 6A to 6G are diagrams illustrating the outline of stain inspection.

DESCRIPTION OF THE PREFERRED EMBODIMENTS

Figure 1B:
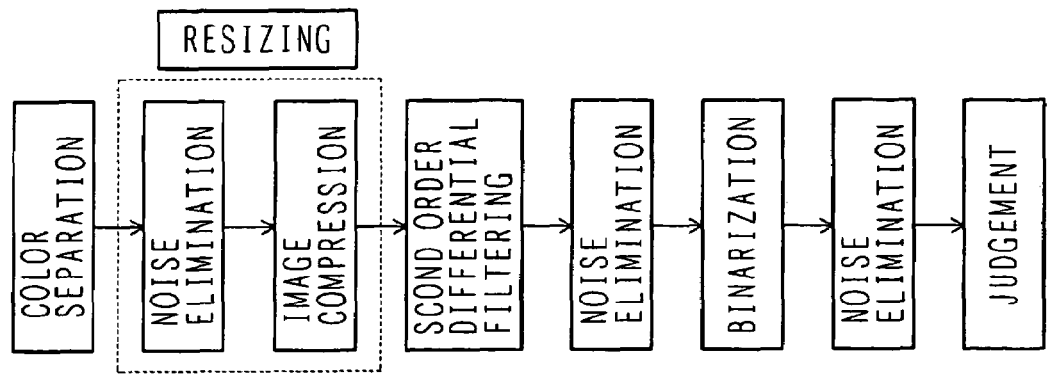
FIG. 1B is a flow chart illustrating a stain inspection method according to an embodiment.
Figure 1A:
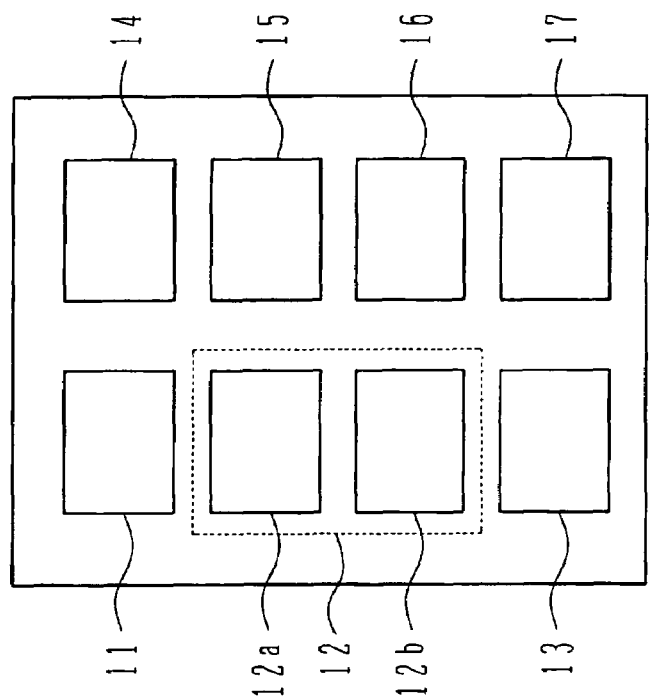
FIG. 1A is a schematic block diagram showing a stain inspection apparatus according to an embodiment.

FIG. 1A is a schematic block diagram showing a stain inspection apparatus according to the embodiment, and FIG. 1B is a flow chart illustrating a stain inspection method according to the embodiment. In the embodiments, description will be made on stain inspection of image data taken with a CCD solid state image pickup device, by way of example. Stains to be inspected are, for example, stains having a level very near to the level of noise components.

Reference is made to FIG. 1A. The stain inspection apparatus of the embodiment is constituted of a color separating unit 11, a resizing unit 12, a second order differential filtering unit 13, a noise eliminating unit 14, a binarizing unit 15, a noise eliminating unit 16 and a judging unit 17. The resizing unit 12 includes a noise eliminating unit 12a and an image compressing unit 12b.

The color separating unit 11 separates a fetched image into images of each color of red (R), green (G) and blue (B).

The resizing unit 12 performs noise elimination and image compression.

The noise eliminating unit 12a eliminates noise components of each image separated by the color separating unit 11.

The image compressing unit 12b performs image compression of the image whose noises are eliminated by the noise eliminating unit 12a. The image compressing unit 12b may perform image compression and noise elimination at the same time.

The second order differential filtering unit 13 filters the images output from the resizing unit 12 to remove the influence of luminance shading and emphasize stain portions.

The noise eliminating unit 14 eliminates noises of data output from the second order differential filtering unit 13. Since the noise eliminating unit 14 has the structure similar to, for example, that of the noise eliminating unit 12a, the noise eliminating unit 12a may substitute for the noise eliminating unit 14.

The binarizing unit 15 binarizes data output from the noise eliminating unit 14. Binarization is performed by comparing a signal value with a threshold value.

The noise eliminating unit 16 eliminates noises of data binarized by the binarizing unit 15. Since the noise eliminating unit 16 has the structure similar to, for example, that of the noise eliminating unit 12a or 14, the noise eliminating unit 12a or 14 may substitute for the noise eliminating unit 16.

The judging unit 17 judges whether any stain exists, in accordance with the values of binarized data whose noises were eliminated by the noise eliminating unit 16, and outputs judgement results. Judgement is performed on the basis of one or more threshold values (a variable threshold value).

Reference is made to FIG. 1B. Each process from color separation to judgement shown in FIG. 1B is executed at a corresponding unit from the color separating unit 11 to the judging unit 17 shown in FIG. 1A.

In a general solid state image pickup device for color photographing, color image data (original data) is generated from incidence light transmitted through color filters, for example, of three primary colors of red (R), green (G) and blue (B). In the stain inspection method of the embodiment, color separation is performed first. Color separation means that red (R), green (G) and blue (B) pixel data (data of pixels upon which light transmitted through the color filters of red (R), green (G) and blue (B) is incident) are extracted from original data and red (R), green (G) and blue (B) images are generated.

In a process of manufacturing a CCD solid state image pickup device, color filters are formed for each of, for example, three primary colors (red (R), green (G) and blue (B)). If stains of an image are formed due to defects generated at a color filter manufacturing stage, the stains can be detected more easily by inspecting each of color-separated images, because the stains in the original image are difficult to be detected due to luminances of other colors. Further, there is a possibility that stain detection can identify a manufacture process which formed defects.

Subsequent processes shown in FIG. 1B are executed for each of color-separated red (R), green (G) and blue (B) images.

If a grey image photographed with a solid state image pickup device not equipped with color filters is to be processed, the color separation process is omitted.

After the color separation, noises (fine warp of image data) are eliminated. This noise elimination and next image compression are collectively called a resizing process.

Noise elimination is performed by using one or more median filters or LPFs of m×n pixels. It is more desirable to use the median filters because LPFs may round a fine edge portion of a stain. Filters are selected depending upon the state (noise level state or the like) of data to be inspected. A combination of median filters and LPFs may be used. A median filter eliminates noises without obscuring edges of an image. The median filter performs a process of obtaining densities of pixels in nearby areas, arranging the densities in the order from the lowest density to the highest density, and using a median (center value) as a pixel value. LPF is a filter not passing frequency components higher than a certain frequency.

In the second order differential filtering process to be described later, a second order differential filter is used for edge detection. In detecting an edge with the second order differential filter, there is a tendency that a large number of noises other than edges are derived. For example, a spot-like flaw is detected as a stain in some cases. Therefore, in the resizing process before the second order differential filtering process, smoothing is performed by using median filters or the like.

Next, image compression is performed. A compression scheme may be a thinning scheme, a nearest neighbor scheme, a bicubic scheme and the like. An inspection time can be shortened by compressing an image. For example, inspection images are compressed to images having the same size, in accordance with pixel sizes. Although inspection images have various sizes, it is desirable to compress the images in the size approximately same as that used for visual inspection (e.g., a vertical size is approximately 480 dots of a video graphics array (VGA)). By normalizing the images by approximately the same size, the subsequent processes can be made common. Image compression may include noise elimination.

After the image compression, second order differential filtering is performed. Filtering is performed with second order differential filter to remove luminance shading from the compressed image and obtain data with emphasized stain edge portions. Both removal of the influence of luminance shading and detection of stain edge portions can be performed by using the second order differential filter. Therefore, a process amount of stain inspection can be reduced and an inspection time can be shortened. The second order differential filtering process will be later detailed.

Next, noise elimination is performed. This process is executed in order not to erroneously judge noise components in the next binarizing process. Noise elimination is performed in a manner similar to, for example, the already described noise elimination in the resizing process.

Next, a binarizing process is executed. Binarization is performed by comparing a signal value with a threshold value. The threshold value is obtained by inspecting a number of inspection image samples and measuring noise levels and the like, prior to stain inspection. The threshold value is set for each color of red (R), green (G) and blue (B). By setting the threshold value for each color, stains and noise components can be distinguished effectively. The threshold value is largest for blue (B), next largest for red (R), and smallest for green (G).

Thereafter, noises are eliminated from data processed in the binarizing process. Noise levels exist randomly at a single pixel or several pixels in a spot state. These noises are eliminated in this noise eliminating process.

Lastly, the judging process is executed. In the judging process, a binarized value is compared with the threshold value determined beforehand for each color to judge whether any stain exists. If two or more threshold values are prepared and the judging process is repeated by using different threshold values, inspection having a higher precision can be performed.

As described earlier, the stain inspection method shown in FIG. 1B inspects each color image of red (R), green (G) and blue (B) formed through color separation. At least one color image data is judged as "having a defect (stain)" (FAIL), the original image is judged also as "having a defect (stain)" (FAIL). If all color images are judged as "not having a defect (stain) (PASS), the original image is judged also as "not having a defect (stain) (PASS).

In this embodiment, stains having a level very near to that of noise components are inspection targets. Therefore, the stain inspection method of the embodiment includes three noise eliminating processes. Depending upon inspection targets, some or all the noise eliminating processes may be omitted. Similarly, in the stain inspection apparatus shown in FIG. 1A, some or all three noise eliminating units 12a, 14 and 16 may be omitted.

In the following, detailed description will be made on the second order differential filtering process to be executed by the second order differential filtering unit 13.

Figure 2:
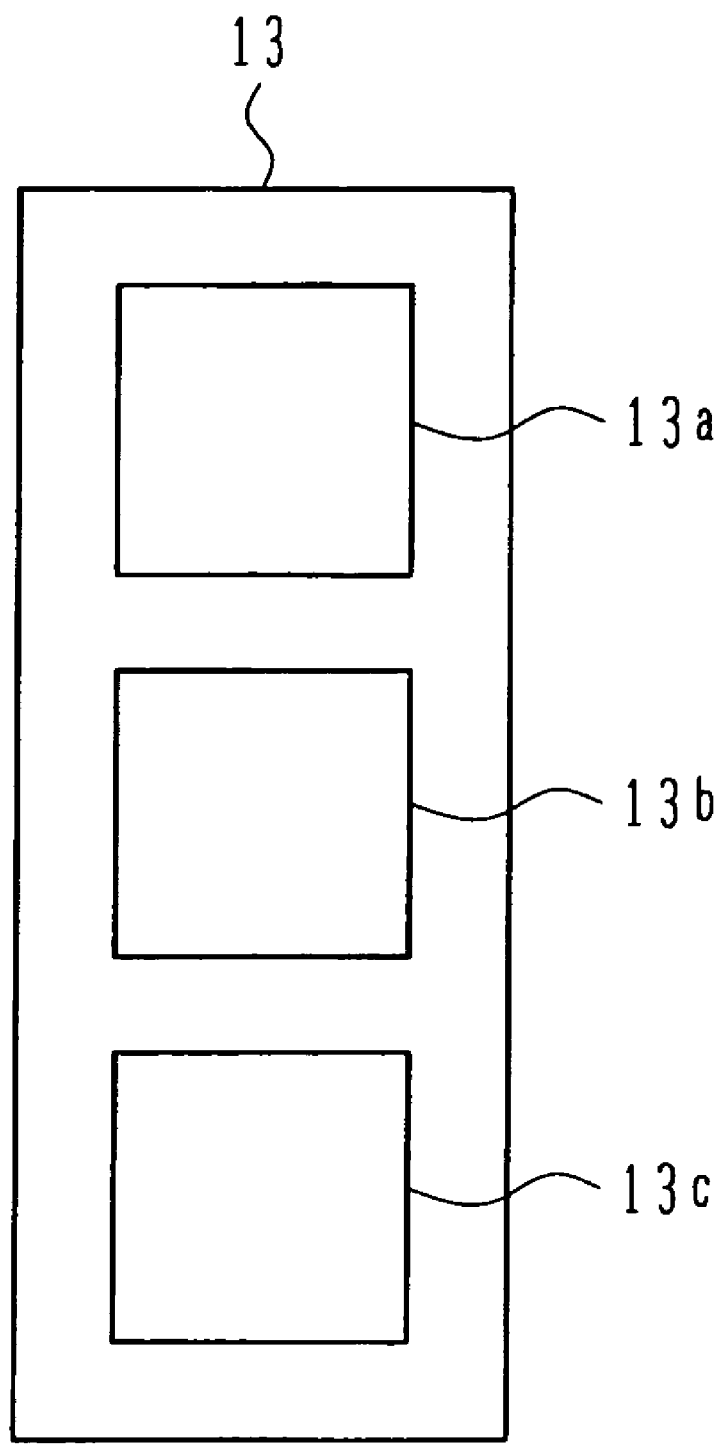
FIG. 2 is a block diagram showing the outline structure of a second order differential filtering unit 13.

FIG. 2 is a block diagram showing the outline structure of the second order differential filtering unit 13. For example, the second order differential filtering unit 13 is constituted of a horizontal (lateral) direction differential filter 13a, a vertical (perpendicular) direction differential filter 13b and an adder 13c.

The horizontal direction differential filter 13a and vertical direction differential filter 13b are second order differential filters. The adder 13c adds together an output of the horizontal direction differential filter 13a and an output of the vertical direction differential filter 13b.

Second order differential filters are used as the horizontal direction differential filter 13a and vertical direction differential filter 13b, because the luminance shading itself is an inclination and if the first order differential filters only, which present techniques of obtaining an inclination, are used, stain detection is difficult.

The second order differential filtering unit 13 may be structured to include the horizontal direction differential filter 13a and not to include the vertical direction differential filter 13b and adder 13c. By adopting this structure, if an inspection image has a stain extending along a horizontal direction, this stain can be detected in a short time.

The second order differential filtering unit 13 may also be structured to include the vertical direction differential filter 13b and not to include the horizontal direction differential filter 13a and adder 13c. By adopting this structure, if an inspection image has a stain extending along a vertical direction, this stain can be detected in a short time.

If the second order differential filtering unit 13 is structured to have the structure shown in FIG. 2, stains can be detected irrespective of the shape and extension direction by adding (linear coupling) the output results of the filters having different directions (two perpendicular directions).

Since the filtering process takes a time, it is desirable to adopt the structure matching the circumstance and detect stains in minimum processes.

In this embodiment, first, first order differential values are obtained between adjacent pixels, and then second order differential values of differences between the first order differential values at positions spaced apart by k (k is a natural number) pixels (e.g., two pixels) are obtained. This second order differential filter can detect effectively even a stain having a gentle edge portion, because the second order differential filter obtains the second order differential value by spacing the first order differential values by the k pixels (e.g., two pixels).

Figure 3A:
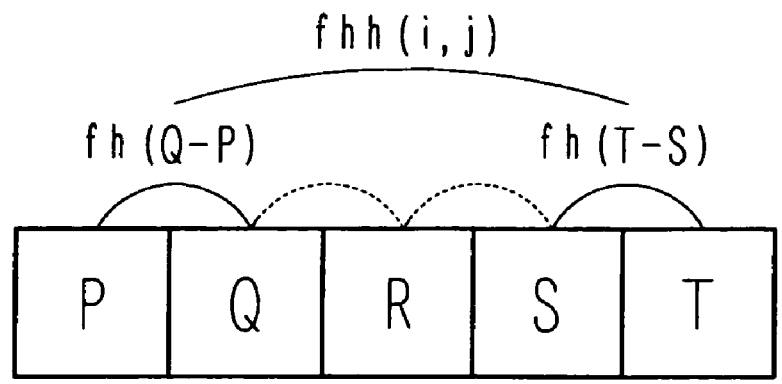
FIGS. 3A and 3B are diagrams illustrating second order differential filters.
Figure 3B:
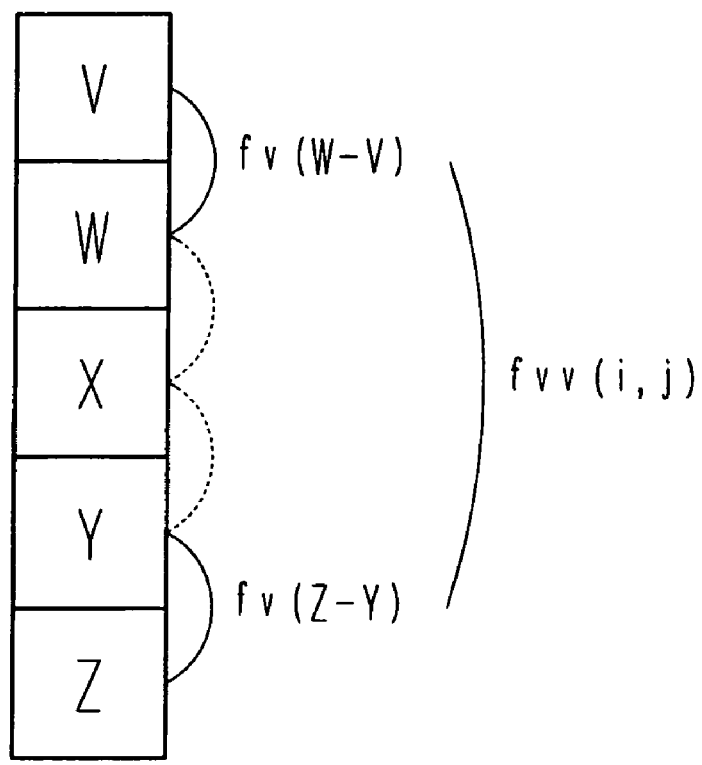

FIGS. 3A and 3B are diagrams explaining second order differential filters. In this example, second order differential values are obtained by spacing the first order differential values by two pixels. For the purposes of description convenience, FIG. 3A shows consecutive five pixels along the horizontal direction and FIG. 3B shows consecutive five pixels along the vertical direction. P to T in FIG. 3A and V to Z in FIG. 3B represent luminance values of pixels.

Reference is made to FIG. 3A. The horizontal direction differential filter 13a will be described. First, a first order differential value is obtained between adjacent pixels along the horizontal direction. The first order differential value along the horizontal direction is represented by a symbol "fh". FIG. 3A shows "fh(Q–P)" indicating a first order differential value (difference) between Q and P and "fh(T–S)" indicating a first order differential value (difference) between T and S.

Next, a difference (second order differential value) is obtained between the first order differential values spaced by two pixels along the horizontal direction. The second order differential value (difference) is represented by a symbol "fhh". A notation fhh(i, j) means a second order differential value at the i-th position in the horizontal direction and at the j-the position in the vertical direction. A notation f(i, j) means a pixel luminance at the i-th position along the horizontal direction and at the j-th position along the vertical direction, respectively in an image.

$$Fhh(i, j) = fh(Q - P) - fh(T - S) \quad (1)$$
$$= \{f(i+2, j) - f(i+1, j)\} - \{f(i-1, j) - f(i-2, j)\}$$
$$= \{f(i+2, j) - f(i+1, j)\} + \{f(i-2, j) - f(i-1, j)\}$$

A second order differential value is obtained by using the equation (1).

Reference is made to FIG. 3B. The vertical direction differential filter 13b will be described. First, a first order differential value is obtained between adjacent pixels along the vertical direction. The first order differential value along the vertical direction is represented by a symbol "fv". FIG. 3B shows "fv(W–V)" indicating a first order differential value (difference) between W and V and "fv(Z–Y)" indicating a first order differential value (difference) between Z and Y.

Next, a difference (second order differential value) is obtained between the first order differential values at positions spaced by two pixels along the vertical direction. The second order differential value (difference) is represented by a symbol "fvv". A notation fvv(i, j) means a second order differential value at the i-th position in the horizontal direction and at the j-the position in the vertical direction. Similar to the above description, a notation f(i, j) means a pixel luminance at the i-th position along the horizontal direction and at the j-th position along the vertical direction, respectively in an image.

Similar to the first equation (1), $$fvv(i,j) = \{f(i,j+2) - f(i,j+1)\} + \{f(i,j-2) - f(i,j-1)\} \quad (2)$$

A second order differential value is obtained by using the equation (2).

FIGS. 4A to 4D show examples of the horizontal direction differential filter 13a and vertical direction differential filter 13b.

Reference is made to FIG. 4A. FIG. 4A shows an example of the horizontal direction differential filter 13a of 7×5 pixels (seven pixels along the horizontal direction, five pixels along the vertical direction).

A filtering process is executed along the horizontal direction by using the horizontal direction differential filter 13a shown in FIG. 4A. In the filtering process, a first order differential value between adjacent pixels along the horizontal direction is obtained to remove the influence of luminance shading along the horizontal direction. A second order differential value is obtained between spaced pixels to emphasize stain edge portions. Averaging is made along the vertical direction, Reference is made to FIG. 4B. FIG. 4B shows an example of the vertical direction differential filter 13b of 5×7 pixels (five pixels along the horizontal direction, seven pixels along the vertical direction).

A filtering process is executed along the vertical direction by using the vertical direction differential filter 13b shown in FIG. 4B. In the filtering process, a first order differential value between adjacent pixels along the vertical direction is obtained to remove the influence of luminance shading along the vertical direction. A second order differential value is obtained between spaced pixels to emphasize stain edge portions. Averaging is made along the horizontal direction.

Reference is made to FIG. 4C. FIG. 4C shows an example of the horizontal direction differential filter 13a of 4×6 pixels (four pixels along the horizontal direction, six pixels along the vertical direction).

Similar to the horizontal direction differential filter 13a shown in FIG. 4A, a first order differential value between adjacent pixels along the horizontal direction is obtained to remove the influence of luminance shading along the horizontal direction. A second order differential value is obtained between spaced pixels to emphasize stain edge portions. Averaging is made along the vertical direction.

Reference is made to FIG. 4D. FIG. 4D shows an example of the vertical direction differential filter 13b of 6×4 pixels (six pixels along the horizontal direction, four pixels along the vertical direction).

Similar to the vertical direction differential filter 13b shown in FIG. 4B, a first order differential value between adjacent pixels along the vertical direction is obtained to remove the influence of luminance shading along the vertical direction. A second order differential value is obtained between spaced pixels to emphasize stain edge portions. Averaging is made along the horizontal direction.

By using these filters, even a stain having a gentle edge portion can be detected effectively.

FIGS. 5A and 5B show a filter obtained by improving the horizontal direction differential filter 13a shown in FIG. 4A and a filter obtained by improving the vertical direction differential filter 13b shown in FIG. 4B.

The filter shown in FIG. 5A has large weighted coefficients in the central area of the columns along the vertical direction.

The filter shown in FIG. 5B has large weighted coefficients in the central area of the rows along the horizontal direction.

The weighting modes are not limited only to the modes shown in FIGS. 5A and 5B. Weighting can emphasize further the edge portions and a stain can be detected more effectively.

FIGS. 6A to 6G illustrate the outline of stain inspection.

In order to facilitate understanding, description will be made on an example that the second order filtering unit 13 includes the horizontal direction differential filter 13a and does not include the vertical direction differential filter 13b and adder 13c.

Reference is made to FIG. 6A. Description will be made on an inspection sequence when there is a stain 10 on an image 20. Z and W in FIGS. 6A to 6G represent an edge portion of the stain 10 along the horizontal direction. In the following, an output between X and Y will be described.

Reference is made to FIG. 6B. FIG. 6B shows a luminance between X and Y after the color separation process. A luminance in the stain 10 is shown between Z and W. The luminance reduces from X toward Y because of luminance shading.

Reference is made to FIG. 6C. FIG. 6C shows a luminance between X and Y after the image compression process. Since the noise eliminating process was executed, fine concave and convex portions are made more gentle as compared to those shown in FIG. 6B. Since the image compression process was executed, a width between X and Y is reduced.

Reference is made to FIG. 6D. FIG. 6D shows an output between X and Y after the second order differential filtering process. The influence of luminance shading is removed and the output value is made flat. A high output value appears at V in addition to the edge portion Z and W.

Since the second order differential values are obtained by spacing the first order differential values by the k (k is a natural number) pixels (e.g., two pixels), the influence of luminance shading can be removed and the edge portion of the stain can be emphasized (made clear). Therefore, even a stain having a gentle edge portion can be detected effectively.

Reference is made to FIG. 6E. FIG. 6E shows an output between X and Y after the noise eliminating process following the second order differential filtering process. As compared to FIG. 6D, concave and concavity portions of the curve become smooth.

Reference is made to FIG. 6F. FIG. 6F shows an output between X and Y after the binarizing process. Outputs over the threshold value appear at V in addition to the stain edge portion Z and W.

Reference is made to FIG. 6G. FIG. 6G shows an output between X and Y after the noise eliminating process following the binarizing process. Noise components at V are eliminated.

Presence/absence of stains are judged in accordance with the output after this noise eliminating process.

If the second order filtering unit 13 has the structure including the vertical direction differential filter 13b and adder 13c in addition to the horizontal direction differential filter 13a (the mode shown in FIG. 2), inspection using the horizontal direction differential filter 13a is terminated once before the binarizing process (at the noise eliminating process after the second order differential filtering shown in FIG. 6E). Next, by using the vertical direction differential filter 13b, the processes up to the noise eliminating process after the second order differential filtering process are executed in a similar manner. Then, the output shown in FIG. 6E obtained by using the horizontal direction differential filter 13a is added to an output corresponding to that shown in FIG. 6E and obtained by using the vertical direction differential filter 13b, and the added output is subjected to the binarizing process and noise eliminating process to judge whether there is any stain.

Figure 7:
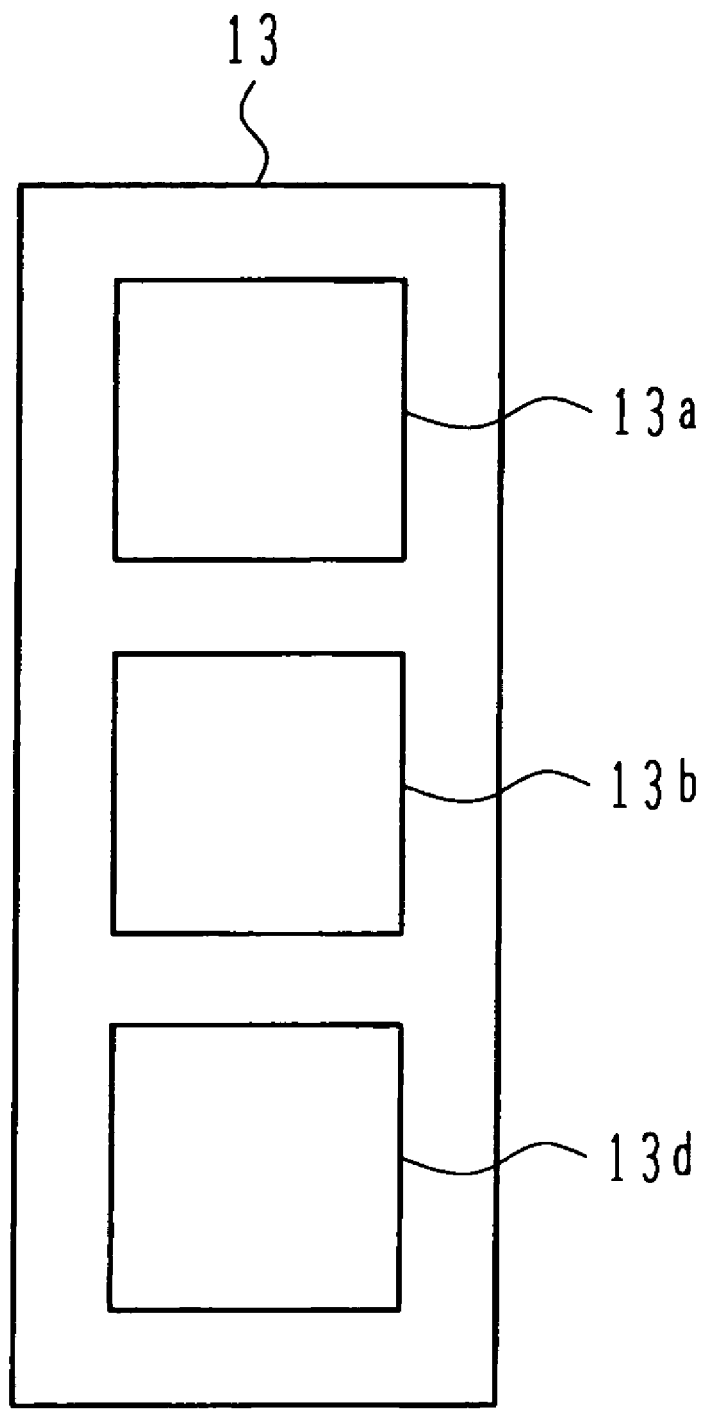
FIG. 7 is a block diagram showing another example of the outline structure of the second order differential filtering unit 13.

FIG. 7 is a block diagram showing another example of the outline structure of the second order differential filtering unit 13. As compared with the second order differential filtering unit 13 shown in FIG. 2, a different point resides in that a comparator 13d is used in place of the adder 13c.

The comparator 13d compares an output of the horizontal direction differential filter 13a with an output of the vertical direction differential filter 13b, and selects and delivers the output having a larger absolute value.

Even if the structure using the comparator 13d in place of the adder 13c is adopted, presence/absence of a stain can be judged properly by using an output after the binarizing process or after the following noise eliminating process, irrespective of the shape and extension direction of the stain.

Also in the case using the comparator 13d, an output corresponding to that shown in FIG. 6E and obtained by using the horizontal direction differential filter 13a is compared with an output corresponding to that shown in FIG. 6E and obtained by using the vertical direction differential filter 13b, and a selected output after the comparison is subjected to the binarizing process and noise eliminating process to judge whether a satin exists.

Although the second order differential filtering units 13 shown in FIGS. 2 and 7 perform filtering along the horizontal and vertical directions, these units may perform filtering along an oblique direction. For example, second order differential values are obtained along a 45° oblique direction for m×m pixels (square matrix shape).

Depending upon the shape and extension direction of a stain to be detected, filtering is performed along a proper direction so that stain inspection can be performed more effectively.

FIGS. 8A to 8E are diagrams illustrating stain detection by a binarizing process.

Figure 8A:
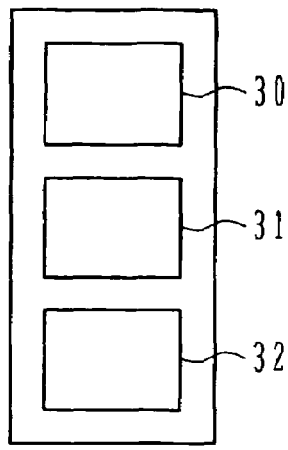
FIGS. 8A to 8E are diagrams illustrating stain detection by a binarizing process.

FIG. 8A is a schematic block diagram showing a stain inspection apparatus for stain inspection through the binarizing process.

The stain inspection apparatus includes a binarizing unit 30 for binarizing luminance data, a noise eliminating unit 31 for eliminating noises from the luminance data binarized by the binarizing unit 30, and a judging unit 32 for judging presence/absence of a stain in accordance with the luminance data with noises being eliminated by the noise eliminating unit 31. If an inspection subject has small noises, the noise eliminating unit 31 may be omitted. In this case, the judging unit 32 judges presence/absence of a stain in accordance with the luminance data binarized by the binarizing unit 30.

Figure 8B:

FIG. 8B shows an example of luminance data. The luminance data shown in FIG. 8B is input to the binarizing unit 30.

Figure 8C:

FIG. 8C shows data binarized by the binarizing unit 30. By using a threshold value, a luminance portion equal to or larger than a predetermined value and a luminance portion smaller than the predetermined value are binarized.

Figure 8D:

Reference is made to FIG. 8D. Noises are eliminated from the binarized data. FIG. 8D shows binarized data with noises being eliminated by the noise eliminating unit 31. This binarized data is input to the judging unit 32.

Figure 8E:

Reference is made to FIG. 8E. For example, by using a threshold value, a portion having a width equal to or wider than a predetermined value is judged as a stain. In this case, a plurality of different threshold values (a variable threshold value) may be used. If judgement cannot made properly by using a first threshold value, the next threshold value is used for judgement of presence/absence of a stain.

The present invention has been described in connection with the preferred embodiments. The invention is not limited only to the above embodiments. The invention can be applied properly to general stain inspection technologies of inspecting a stain such as plating irregularity and coating irregularity, on an image photographed with a solid state image pickup apparatus, an LCD, a PDP, a shadow mask, a screen, a photosensitive film, a polarization film and a printed circuit board. It will be apparent to those skilled in the art that other various modifications, improvements, combinations, and the like can be made.

What we claim are:

1. A stain inspection method, comprising:
   preparing luminance data;
   by using a first differential filter, obtaining a group of first order differential values from luminance values of said luminance data along a first direction, obtaining a group of second order differential values from said group of first order differential values, and outputting first data in accordance with said group of second order differential values; and obtaining another group of first order differential values from luminance values of said luminance data along a second direction, different from said first direction, obtaining another group of second order differential values from said another group of first order differential values, and outputting second data in accordance with said another group of second order differential values, wherein said luminance data prepared in said preparing luminance data is obtained by compressing original luminance data or by eliminating noises from the original luminance data, and wherein noises are eliminated by using a median value obtained for a plurality of pixels.

2. The stain inspection method according to claim 1, wherein said second order differential value is obtained from said first order differential values at positions which are not consecutive.

3. The stain inspection method according to claim 1, wherein said second order differential value is obtained from said first order differential values at positions which are spaced apart by a predetermined distance.

4. The stain inspection method according to claim 1, wherein said first and second directions are perpendicular to each other.

5. The stain inspection method according to claim 1, further comprising:
adding said first and second data, and outputting third data.

6. The stain inspection method according to claim 5, wherein said adding said first and second data, and outputting said third data includes eliminating noises after addition.

7. The stain inspection method according to claim 5, further comprising:
after said adding said first and second data and outputting said third data, binarizing said third data.

8. The stain inspection method according to claim 7, wherein in said binarizing said third data, noises are eliminated after binarizing said third data.

9. The stain inspection method according to claim 1, further comprising:
comparing said first data with said second data, and selecting fourth data having a larger absolute value to output fourth data.

10. The stain inspection method according to claim 9, wherein said comparing said first data with said second data, and selecting said fourth data includes eliminating noises after comparison and selection.

11. The stain inspection method according to claim 9, further comprising:
after said comparing said first data with said second data and selecting said fourth data, binarizing said fourth data.

12. The stain inspection method according to claim 11, wherein in said binarizing said fourth data, noises are eliminated after binarizing said fourth data.

13. The stain inspection method according to claim 1, wherein said luminance data is luminance data of a color-separated image.

14. The stain inspection method according to claim 1, further comprising eliminating noises from said second order differential values.

15. The stain inspection method according to claim 1, further comprising:

after said outputting said first data in accordance with said group of second order differential values, binarizing said first data.

16. The stain inspection method according to claim 15, wherein in said binarizing said first data, noises are eliminated after binarizing said first data.

17. The stain inspection method according to claim 1, further comprising:
after said outputting said second data in accordance with said another group of second order differential values, binarizing said second data.

18. The stain inspection method according to claim 17, wherein in said binarizing said second data, noises are eliminated after binarizing said second data.

19. The stain inspection method according to claim 1, further comprising:
following any one of said outputting said first data in accordance with said group of second order differential values, said outputting said second data in accordance with said another group of second order differential values, said adding said first and second data and outputting said third data, said comparing said first data with said second data and selecting said fourth data, said binarizing said first data, said binarizing said second data, said binarizing said third data, or said binarizing said fourth data, judging presence/absence of a stain by using a variable threshold value.

20. A stain inspection method, comprising:
preparing luminance data;
by using a first differential filter, obtaining a group of first order differential values from luminance values of said luminance data along a first direction, obtaining a group of second order differential values from said group of first order differential values, and outputting first data in accordance with said group of second order differential values; and obtaining another group of first order differential values from luminance values of said luminance data along a second direction, different from said first direction, obtaining another group of second order differential values from said another group of first order differential values, and outputting second data in accordance with said another group of second order differential values, binarizing said luminance data by a binarizing unit; and
at least after or before said binarizing said luminance data, eliminating noises, wherein said noises are eliminated by using a median value obtained for a plurality of pixels.

21. The stain inspection method according to claim 20, further comprising:
after said binarizing said luminance data or said eliminating noises, judging presence/absence of a stain by using a variable threshold value.

22. A stain inspection apparatus, comprising:
filtering means, comprising:
a first, second order differential filter for obtaining a group of first order differential values from luminance values of the luminance data along a first direction, obtaining a group of second order differential values from said group of first order differential values; and a second, second order differential filter for obtaining another group of first order differential values from luminance values of said luminance data along a second direction, different from said first direction, obtaining another group of second order differential values from said another group of first order differential values; and noise eliminating means for eliminating noises from data processed by said filtering means and not binarized by said binarizing means, or from data binarized by said binarizing means before said judging means judges presence/absence of a stain, wherein said noise eliminating means eliminates noises by using a median value obtained for a plurality of pixels.

23. The stain inspection apparatus according to claim 22, wherein said first or said second, second order differential filter obtains the second order differential values at positions which are not consecutive.

24. The stain inspection apparatus according to claim 22, wherein said first or said second, second order differential filter obtains the second order differential values at positions which are spaced apart by a predetermined distance.

25. The stain inspection apparatus according to claim 22, wherein said first and said second directions are perpendicular to each other.

26. The stain inspection apparatus according to claim 22, wherein said filtering means further comprises an adder for adding an output of said first, second order differential filter and an output of said second, second order differential filter.

27. The stain inspection apparatus according to claim 22, wherein said filtering means further comprises a comparator for comparing an output of said first, second order differential filter with an output of said second, second order differential filter, and selecting the output having a larger absolute value.

28. The stain inspection apparatus according to claim 22, further comprising binarizing means for binarizing data processed by said filtering means.

29. The stain inspection apparatus according to claim 22, further comprising judging means for judging presence/absence of a stain in accordance with data processed by said filtering means or data processed by binarizing means.

30. The stain inspection apparatus according to claim 22, further comprising compressing means for generating said luminance data to be processed by said filtering means, by compressing original luminance data or eliminating noises from the original luminance data.

31. The stain inspection apparatus according to claim 22, further comprising color separating means for separating an original image into color-separated images, wherein data after color separation is used as said luminance data to be processed by said filtering means.

32. A stain inspection apparatus, comprising:

filtering means, comprising:
a first, second order differential filter for obtaining a group of first order differential values from luminance values of the luminance data along a first direction, obtaining a group of second order differential values from said group of first order differential values; and
a second, second order differential filter for obtaining another group of first order differential values from luminance values of said luminance data along a second direction, different from said first direction, obtaining another group of second order differential values from said another group of first order differential values; and binarizing means for binarizing luminance data; and noise eliminating means for eliminating noises from said luminance data binarized by said binarizing means, wherein said noise eliminating means eliminates noises by using a median value obtained for a plurality of pixels.

33. The stain inspection apparatus according to claim 32, further comprising judging means for judging presence/absence of a stain in accordance with said luminance data binarized by said binarizing means or said luminance data with said noises being eliminated by said noise eliminating means.

* * * * *